United States Patent
Hunter

(10) Patent No.: US 8,976,409 B2
(45) Date of Patent: Mar. 10, 2015

(54) LARGE SHEET IMAGE ON PAPER REGISTRATION

(71) Applicant: Xerox Corporation, Norwalk, CT (US)

(72) Inventor: Jonathan B. Hunter, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/803,311

(22) Filed: Mar. 14, 2013

(65) Prior Publication Data

US 2014/0268189 A1    Sep. 18, 2014

(51) Int. Cl.
*H04N 1/00* (2006.01)

(52) U.S. Cl.
CPC ....... *H04N 1/00599* (2013.01); *H04N 1/00278* (2013.01); *H04N 1/00702* (2013.01)
USPC .......................................................... 358/1.5

(58) Field of Classification Search
USPC .......................................................... 358/1.5
See application file for complete search history.

(56) References Cited

U.S. PATENT DOCUMENTS

| | | | |
|---|---|---|---|
| 2006/0139394 A1* | 6/2006 | Wada | 347/19 |
| 2007/0022883 A1* | 2/2007 | Dubuit et al. | 101/115 |
| 2010/0245852 A1* | 9/2010 | Fujita | 358/1.2 |
| 2010/0309526 A1* | 12/2010 | Kulkarni et al. | 358/3.26 |
| 2013/0293652 A1* | 11/2013 | Spence et al. | 347/104 |

FOREIGN PATENT DOCUMENTS

JP    2004-276394    * 10/2004 ................. B41J 2/01

OTHER PUBLICATIONS

Machine translation for JP 2004-276394.*

* cited by examiner

*Primary Examiner* — Qian Yang
(74) *Attorney, Agent, or Firm* — Hoffmann & Baron, LLP

(57) ABSTRACT

An image registration system which helps to accurately produce an image onto an oversized media substrate in a large scale printer. The image registration system includes a rail support track, a printing zone, and a platen cart moveable along the rail support track through said printing zone. The image registration system also includes an image capturing apparatus for capturing a position of the media substrate in relation to the platen cart in order to ensure accurate image on media substrate reproduction.

14 Claims, 4 Drawing Sheets

LARGE SHEET IMAGE ON PAPER REGISTRATION

TECHNICAL FIELD

The present disclosure relates to a system for accurately transferring an image on a substrate of media, particularly on large media surfaces.

BACKGROUND

Document processing devices, such as printers and copiers, include systems for transporting sheets of substrate media there-through. In order to increase the throughput of the device, the transport systems are designed to move the media rapidly along a media processing path. Transport systems may include wide transport belts or the media may be held against a large flat table for printing. One portion of the path which can negatively influence throughput is travel through a print zone in which an image will be imparted thereon. In the print zone, it is important that the movement of the sheet be precisely controlled to establish a high quality output. Moving the media into and out of the print zone in a controlled manner typically requires complicated transfers and involves various steps.

In color printing, color images are produced on a print media by repeatedly superimposing on a single print sheet different image layers or color image separations. This is typically accomplished by a process wherein subsequent image layers are formed on subsequent passes of the photoreceptor, each writing a different image layer during a single revolution of the photoreceptor (single pass) or by employing multiple exposure devices each writing a different layer on different photoreceptors. The toned developed image is then transferred from the photoreceptor(s) to paper or similar material, and the toner image is fixed by heat and pressure (fusing) to form a permanent copy.

In document processing devices designed for normal sized media substrates, proper registration of an image on media substrate is ensured through the use of charge-coupled devices (ccd). Ccd sensors are used to detect the position of the edge of a piece of paper, and relay that position to steering rollers which are moving the paper along the processing path. The steering rollers then appropriately adjust the movement of the paper to ensure the paper is engaged by the printer at the proper location for accurate registration.

This is mostly impossible with document processing devices which cater to over-sized media substrates, particularly those devices and systems which utilize platen carts on rails which are particularly heavy (upwards of 400 pounds). In these printers and systems it is difficult, if not impossible to adjust the location of the media substrate by adjusting the paper processing path on most axises. High speed inkjet marking devices for large sized cut sheets are particularly constrained using contemporary systems with regard to production output, media type and image quality. Also, such systems tend to be inflexible and difficult to change or modify, particularly with regard to their automated components.

Also, document processing devices, including high speed inkjet printing assemblies, include systems for transporting sheets of substrate media there-through. In order to increase the throughput of the device, the transport systems are designed to move the media rapidly along a media processing path. However, transporting large media such as cut sheets as large as 60"×40", can be more difficult. Large media can be harder to hold flat across a large printing zone. Also, image quality can be an issue when printing across a large printing zone.

Contemporary large sheet printers use a multi-pass system in which a sheet of paper moves under fixed heads multiple times or the heads move over the paper multiple times. Multiple passes between the print heads and the sheet reduce productivity by slowing down production and tend to diminish image quality due to the difficulties in targeting the sheet in the desired location on different passes. It is accordingly critical to ascertain proper location of the media substrate relative to the platen cart, and have a system in place to properly adjust either the substrate location of the printer output in order to provide appropriate image on paper registration.

Accordingly, it would be desirable to provide a media transport system and method for accurately transferring an image onto a media substrate to permit high quality outputs.

SUMMARY

Provided therefore herein is an image registration system for accurately producing an image onto an oversized media substrate in a large scale printer. The image registration system includes a rail support track, a printing zone, and a platen cart moveable along the rail support track through said printing zone. The image registration system also includes an image capturing apparatus and an image processing system. The image capturing apparatus and image processing system are used to capture a position of the media substrate on the platen cart, and relay the position to the printing zone, which makes positional adjustments to accommodate the position in order to ensure accurate image on media substrate reproduction.

In an embodiment, the image processing system of the registration system includes a digital signal relaying system including at least one transmitter and at least one receiver. The image capturing apparatus utilizes the relaying system to transmit the position of the media substrate on the platen cart to the receiver, which is controllingly engaged with the printing zone. In another embodiment, the image processing system further comprises an image on paper registration correction system. In an embodiment, the image on paper registration correction system is one of a Contone High Addressable Image Path Electronic Registration (CHIPER), or an Image Registration Error Control Technology (IRECT).

In another embodiment, the image capturing apparatus is a two dimensional array camera. In another embodiment, the image capturing apparatus is a digital camera. In yet another embodiment, the print zone includes a printing assembly, which is an inkjet assembly for marking the media substrate.

In a further embodiment, the media substrate for which the image registration system is designed is a cut sheet having dimensions of at least forty inches by sixty inches. In another embodiment, the image registration system further includes a sheet loader for placing the media substrate on the platen cart. In still another embodiment, the media substrate is held in place on the platen cart by an applied force.

Also disclosed herein is a method of accurately producing an image on an over-sized media substrate. The method includes loading the over-sized media substrate on a platen cart; capturing a location of the media substrate on the platen cart with an image capturing apparatus to determine positioning of the media substrate relative to the platen cart; and transporting the oversized media substrate on the platen cart on the rail support track through a printing zone, and relaying the position to a printing zone with an image processing system so that the printing zone makes positional adjustments to ensure accurate image production on the over-sized media substrate.

DETAILED DESCRIPTION

Figure 1:
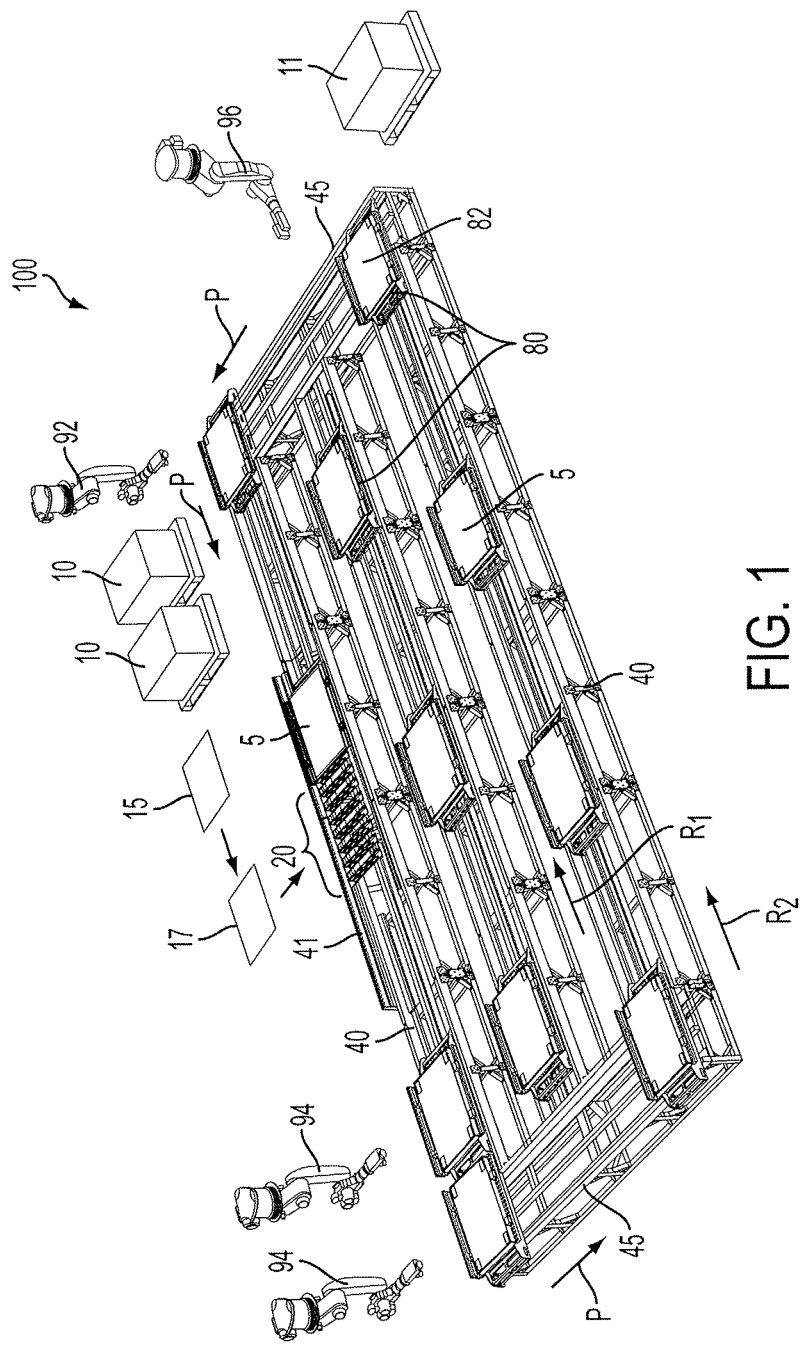
FIG. 1 is a perspective view of media printing system in accordance with an aspect of the disclosed technologies.

Describing now in further detail these exemplary embodiments with reference to the Figures.

"Image data" or ("digital image") as used herein refers to data received by an image input device which converts groups of data into pixel color values through means well established. The image data represents an idealized representation of the original document.

An "image path" as used herein is understood to be a path of an image processing system which, at a first end, receives pixels or data structures of the image, processes the pixels by performing one or more operations thereon, and provides the processed image data to one or more devices such as a print engine in the image path. The image path further incorporates or is in communication with various device control functionality of the print system. In complex multifunction devices, an electronic registration process in the image path compensates for errors in IOP registration caused by shrinkage, stretching, and/or skew by inserting/removing whole or partial pixel columns/rows to/from the image. This electronic registration process may also shift the entire image in the process or cross process direction to align the image to the paper.

An "image processing system" as used herein refers to a hardware or software system for processing image data of a document received from an image input device. The image processing system preferably resides in the image path of a complex document reproduction system and may further incorporate various aspects of a color management system. Various embodiments of the present method are directed towards the image processing system placed in the image path. The image processing system can, upon receipt of measurements relating to IOP registration errors, manipulate pixels in the digital image to compensate for positioning errors such that printed images are at desired positions relative to paper.

As used herein, "media substrate" or "sheet" refers to a substrate onto which an image can be imparted. Such media substrates may include but is not limited to paper, transparencies, parchment, film, fabric, plastic, photo-finishing papers, corrugated board, or other coated or non-coated substrate media upon which information or markings can be visualized and/or reproduced.

As used herein, "oversized media substrate" refers to a media substrate which is bigger than the standard 8.5 by 11 inches, or standard A4 paper. In a preferred embodiment, the oversized media substrate is 40 by 60 inches.

As used herein, "print zone" refers to the location in a media processing path in which an image is imparted to the media substrate. Included in a print zone may be a printer, a printing assembly, or a printing system.

Such printer, printing assembly, or printing system can use an "electrostatographic process" to generate printouts, which refers to forming an image on a substrate by using electrostatic charged patterns to record and reproduce information, a "xerographic process", which refers to the use of a resinous powder on an electrically charged plate record and reproduce information, or other suitable processes for generating printouts, such as an ink jet process, a liquid ink process, a solid ink process, and the like. Also, a printing system can print and/or handle either monochrome or color image data.

As used herein, "media entrance station" refers to a location in the media processing path where the sheet of media is transferred from one portion of the processing path into another portion of the processing path.

As used herein, "platen cart" is a media transport device or devices which supports a media substrate in a prostrate position and moves the media substrate along the media processing path. Such a media transport device includes a frame holding a platen, or a sled, for directly supporting the substrate media sheet thereon. A cart or media cart as described herein can include a sled running on rails, a conveyance having wheels in rolling engagement with a track, other moveable carriage structure and/or any combination thereof.

As used herein, "Image on paper registration," or "IOP registration" refers to measurements, calibrations, and processes to identify and ensure proper reproduction of a pattern or grouping of geometric shapes, such as dots, with respect to one or more positions of the medium whereon the pattern is marked. IOP registration therefore refers to accurate printing of images on a media substrate.

As used herein, a "registration system" refers to processes and associated hardware and software used to properly position substrates of media relative to the printing process as the substrates move through a digital document reproduction system for the deposition of images thereupon.

In an active registration system, a sheet passes over sensor arrays from which the sheet skew, lateral offset, and process errors are calculated. The sheet is passed through a printing zone, or a fuser that fuses the image to the sheet. Passing a fused print to a second print engine (or come back to the same print engine for duplex printing) may lead to dehydration of the paper and, consequently, distortions. Distortion can lead to misalignment of the image portions printed in the two print engines and, even with a perfect shift and tilt registration between two engines (or 2 sides), the resulting artifact due to the misalignment may be still perceptible. Thus, between print engines (or two sides) an image processing registration operation is performed on the digital image to ensure that the sheet is well registered with an image printed by the previous print engine (or the first side). In such a process, the image printed on the sheet by the first print engine (or the first side) is sensed by an image sensing unit. The image sensing unit may comprise any type of electronic sensor including a charge coupled device (CCD) array or, for example, a full width array (or imaging bar) or an offline scanner. A CCD or full width array typically comprises one or more linear arrays of photo-sites wherein each linear array may be sensitive to one or more colors. Full width arrays typically incorporate at least three different color filters, such as red, green and blue, overlying three rows of closely spaced light sensor elements (photo-sites) to provide electrical output signals corresponding to the image. Imaging bars are typically formed by edge butting together a number of individual imaging chips, each having such multiple tiny and closely spaced photo-sites. Having the sensed position of the reference features allows for processing on the digital image in a second print engine (or side) to ensure suitable registration with the previously printed image via a controller which provides sufficient position and orientation for the registration operation. The process repeats for each of the print engines (or each of side) in the image path. In a four color printer wherein each color print engine marks the media substrate with a difference color such as CMYK, measurements are obtained at the output of a first print engine (or first side) and an amount of a correction is provided to a second print engine (or second side) by a controller unit to ensure suitable registration. The output of the second print engine is then measured and corrections applied to the third print engine by a device controller, and so forth. An electronic registration process, such as CHIPER, may be employed in the image path between each of the print engines such that an amount of compensation can be made to the image in advance of the printing of a next colorant layer by a next print engine. The second print engine, in the description above, can also represent the same print engine with the sheet going back after sheet inversion for printing on side 2. In that case, the electronic registration compensation may be applied to reduce side1-side2 registration errors.

With reference to FIG. 1, an apparatus and image registration system 100 for handling a sheet of media substrate in a printing assembly is shown. The sheet handling apparatus 100 is suitable for handling high speed inkjet marking for large size cut sheet paper with flexibility in automation which can improve production output speed and quality and relieve limitations of sheet/image size, media type and image quality. The apparatus 100 includes a modular rail support track 40 designed to convey one or more platen carts 80. The platen carts 80 are moveable along the rail support track 40 conveying a media substrate sheet 5 in a process direction P. The media substrate 5 is held on a sheet platen 82 of the platen cart 80 as the cart moves along one or more portions of the process path, including one or more of the various routes $R_1$, $R_2$ of the rail support track 40. A supply of sheets 10 can be provided such that a loading apparatus 92 loads a sheet onto the platen cart 80 so it can be conveyed towards a printing zone 20 or other sheet marking or handling stations. Two other sheet handling stations that are shown include sheet inverters 94 and an unloading mechanism 96 for removing and collecting process sheets 11 from the apparatus 100.

An image capturing apparatus 15 is used to ensure proper image on paper registration in the apparatus 100 and overall printing system. The image capturing apparatus locates the position of the media substrate on the platen cart in order to allow the printer to accurately impart an image upon the media substrate. The image capturing apparatus may be a camera. In a preferred embodiment it is a digital camera.

Image capturing apparatus 15 sends, or relays the image to an image processing system representatively shown as 17 in FIG. 1. A transmitter in image processing system 17 sends the image to a receiver, the image being received ultimately by printing zone 20 after going through imaging processing system 17. A flow chart illustrating the process is shown in greater detail in FIG. 4.

In document processing devices designed for normal sized media substrates, proper registration of an image on media substrate is ensured through the use of charge-coupled devices (ccd). Ccd sensors are used to detect the position of the edge of a piece of paper, and relay that position to steering rollers which are moving the paper along the processing path. The steering rollers then appropriately adjust the movement of the paper to ensure the paper is engaged by the printer at the proper location for accurate registration.

This is mostly impossible with document processing devices which cater to over-sized media substrates, particularly those devices and systems which utilize platen carts on rails which are particularly heavy (upwards of 400 pounds). In these printers and systems it is difficult, if not impossible to adjust the location of the media substrate by adjusting the paper processing path on most axises. High speed inkjet marking devices for large sized cut sheets are particularly constrained using contemporary systems with regard to production output, media type and image quality. Also, such systems tend to be inflexible and difficult to change or modify, particularly with regard to their automated components.

Figure 2:
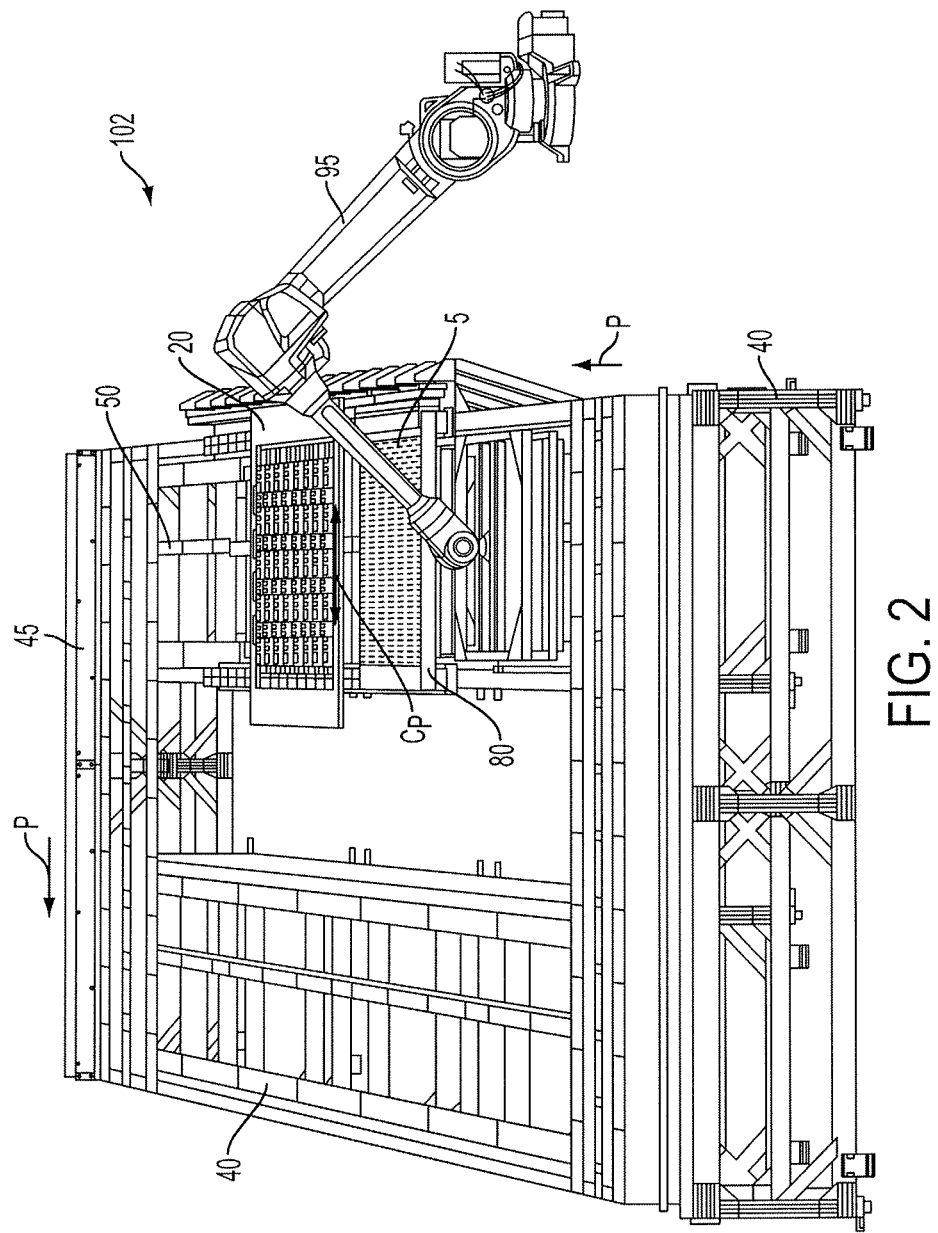
FIG. 2 shows an end view of the media printing system in accordance with an aspect of the disclosed technologies.

The position of the media substrate on the platen cart, or sled, is critical because it is otherwise difficult to determine the position of the media substrate on the sled, and therefore position the printer for accurate image registration. This is in large part because of the nature of how the media substrates are loaded into the printing assembly. FIG. 2 illustrates an apparatus 102 for handling large sheets including a sheet loader 95 which loads media substrate in a printing assembly that includes only a single route coincident with the process path. Also, the apparatus 102 includes a sheet loader 95 that also serves as a sheet unloader. The sheet loader 95 uses a mechanical arm to grab a sheet 5 and position it on the platen cart 80 or remove it therefrom. The sheet loader 95 is similar to the automated arms 92, 94, 96 shown in FIG. 1. Such automated robotic arms 92, 94, 95, 96 can use vacuum suction, grippers or other known means for grabbing and moving large sheets of substrate media from one location to another. Alternative automated and/or robotic systems could be employed, such as a paper elevator feeder or material handling systems. Also, pick/place loading and manual loading can be integrated into the system.

As a result of the use of sheet loaders as described, the exact position of the media substrate on the platen or sled is difficult to determine. The uncertainty makes it difficult to ensure fine registration. Prior practice is to place the sheet on a vacuum sled in an approximate position, and achieve proper IOP performance by image manipulation.

The present invention provides that once an image is captured; e.g., by a digital camera, it will be processed to determine the exact location of the paper relative to the sled. Since the sled travels in an extremely accurate fashion as controlled by the rails, once the relative position of the paper on the sled is known, a correction can be made to the image path to correct the image position. This is particularly advantageous with photo printing, which utilizes high resolution heads. The relative position of the sled to the print heads can typically be known to within plus or minus of one micron.

As previously mentioned, image correction and manipulation routines, such as (including but not limited to) CHIPER or IRECT can be used to re-position and/or re-scale the image correctly to the paper. Such processes are disclosed in U.S. Publication No 2010/0309526, and are herein incorporated by reference.

Within the closed-loop process path defined by the rail support track 40, any number of other stations for application to the media substrate sheets 5 can be provided. For example, additional printing zones can be included, paper cleaning elements, ink curing areas and various other functions that make up a sheet printing and/or marking system. Considering the modular construction of the rail support track 40, these additional functions/features can be interchangeably added or removed from the system 100 as desired.

Ultimately, the rail support track 40 is assembled into a closed-loop, allowing the platen carts 80 to circulate around the track 40. For example, a sheet from the supply 10 can be loaded onto the cart 80 by the loading mechanism 92. Thereafter, the media cart conveys a sheet 5 along the process direction P through the printing zone 20. Once the cart 80 reaches shuttle section 45, the cart is conveyed laterally to one of the two routes $R_1$, $R_2$. In this way, the track 40 provides a looping rail system that forms a media path. As used herein, the term "loop" or "closed loop" with regard to the rail support track refers to a path that diverges from, and afterwards returning to, a starting point along the track. The loop can have alternative routes $R_1$, $R_2$, but preferably makes its way back to a common starting position. In this way, a platen cart 80 moving along the track 40 can re-circulate along one or more sections of the track 40.

Figure 3:
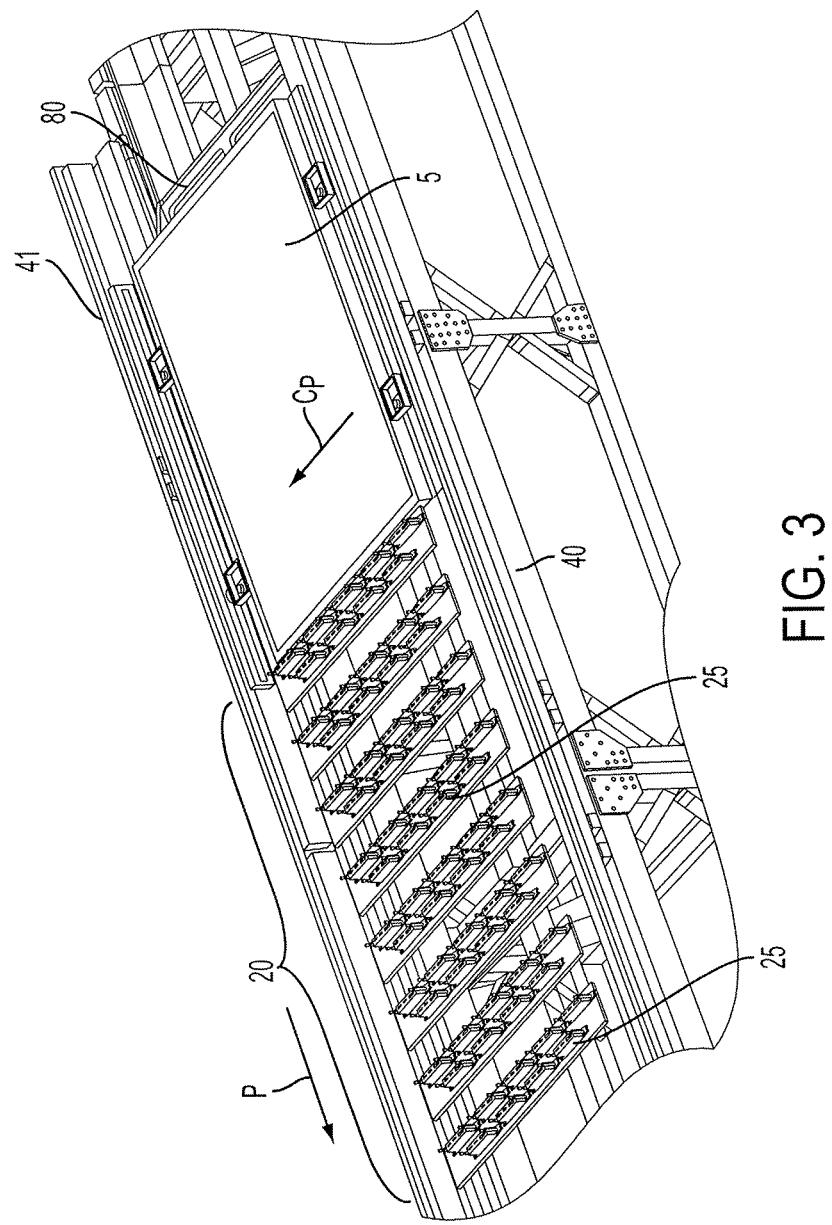
FIG. 3 shows a close up perspective view of the print zone and transport sled in accordance with an aspect of the disclosed technologies.

One aspect of the disclosed technologies uses inkjet printing in the printing zone 20 that lays down an image in a single lateral pass. FIG. 3 shows a relief view of the printing zone 20 from FIG. 1. As shown, the marking cart 80 is conveying a substrate media sheet 5 and has reached a point along the process path where the leading edge of the sheet 5 is just about to enter the printing zone 20. The sheet 5 will next pass once under the print heads 25 at a constant velocity. The print heads are arranged in a printing assembly, or an inkjet assembly. As the paper passes, an image panel is printed thereon. In this way, the inkjet print heads 25 move in a cross process direction laterally across the sheet 5 laying the image down preferably in a single pass. This enables a high through put or production rate, particularly considering the cart does not have to stop or slow down in the marking zone to receive its image. Additionally, a single pass image transfer is enabled by providing at least two staggered rows of individual print heads 25 of the same color. Eight of such paired staggered rows are shown extending laterally across the process path, so the inkjet print assembly does not need to move far in the cross-process direction to cover the full lateral extend of its print range. Thus, with a single lateral pass including only a short burst of lateral movement, the print heads 25 can transfer an image. It should be understood that while an 8-color configuration is shown in marking zone 20, a smaller or greater number of inkjet heads and/or colors can be used for a marking zone in accordance with the disclosure herein. In accordance with an aspect of the disclosed technologies herein any number of colors and curing stations can be integrated into the modular assembly.

An applied force, or a paper hold down force on the platen cart 82 can be enabled via one or more known techniques. For example, vacuum pressure can be provided from a bottom side of the sheet, mechanical gripping fingers could apply pressure to paper perimeter or electrostatic tacking forces could be used. Additionally, print head gap detection and correction can be enabled within the system. An array of sensors will be positioned upstream of the printing cell to detect for media height, flatness and edge curl. This strategy will prevent crashes into the print heads ensure media image quality associated with correct print head to paper gap.

Figure 4:
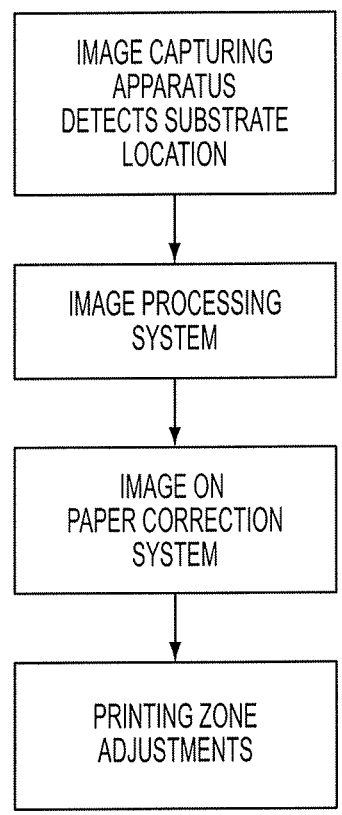
FIG. 4 is a flow chart illustrating the work flow of a printing system of the disclosed technologies.

With reference to FIG. 4, a flow chart illustrating the image path and image processing system of the present invention is shown. In the first step, image capturing apparatus 15 detects location of media substrate 5 on platen cart 80. Image capturing apparatus 15 then transmits image location to image processing system 17. An image on paper correction system as known in the art then is utilized to make printing zone adjustments in order to facilitate proper image on paper registration.

Another aspect of the disclosed technologies relates to handling large substrate media sheets, particularly those that can accommodate for an image zone of 60"×40" with ability to handle paper size of approximately 62"×42". However, it should be understood that an advantage of the disclosed system herein is that smaller paper sizes can still be accommodated, in addition to the larger sheets. Also, the system can be designed to handle even larger paper sizes, if desired. The use of a platen to handle large size cut sheets of substrate media provides the option to introduce printing onto multi-substrate materials such as, acrylic glass (PMMA), canvas, wallpaper, laminates, card boards, metal, aluminum, etc. In this way, a system controller operated from a user interface allows the system to adapt and accommodate various types substrates or ones of varying dimensions. Also, the platen cart 80 or the track 40 can include sensors (not shown) for detecting substrate thickness. In addition to measuring sheet thickness, such sensors can also detect whether the leading edge of a sheet is raised off the platen 82. By automatically measured the sheet leading edge height or the sheet thickness, the gap between the print heads and the sheet can automatically be adjusted. This can prevent the sheet from inadvertently slamming directly into the print heads.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An image registration system for accurately producing an image onto an oversized media substrate in a large scale printer comprising:
    a rail support track;
    a digital printing zone configured to impart an image to said oversized media substrate;
    a platen cart moveable along said rail support track through said printing zone, said printing zone imparting said image to said oversized media substrate while said platen cart moves through said digital printing zone;
    an image capturing apparatus and an image processing system for capturing a position of said media substrate on said platen cart and relaying said position to said digital printing zone, wherein said digital printing zone makes positional adjustments to accommodate said position in order to ensure accurate image on media substrate placement with said platen cart moving through said printing zone; and
    wherein said image processing system further comprising a digital signal relaying system comprising at least one transmitter and one receiver, and wherein said image capturing apparatus transmits said position of said media substrate on said platen cart to said receiver, which is controllingly engaged with said printing zone.

2. The image registration system of claim 1 wherein said image processing system further comprises an image on paper correction system.

3. The image registration system of claim 2 wherein said image on paper corrections system comprises Contone High Addressable Image Path Electronic Registration (CHIPER), or the Image Registration Error Control Technology (IRECT).

4. The image registration system of claim 1 wherein said image capturing apparatus is a two dimensional array camera.

5. The image registration system of claim 1 wherein said image capturing apparatus is a digital camera.

6. The image registration system of claim 1 wherein said print zone includes a printing assembly comprising an inkjet assembly for marking said media substrate.

7. The image registration system of claim 1 wherein said media substrate is a cut sheet having dimensions of at least forty inches by sixty inches.

8. The image registration system of claim 1 further comprising a sheet loader for placing said media substrate on said platen cart.

9. The image registration system of claim 1 wherein said media substrate is held in place on said platen cart by an applied force.

10. The image registration system of claim 1 wherein said large scale printer is used for photo quality printing.

11. A method of accurately producing an image on an over-sized media substrate with an image processing system comprising:
   loading said over-sized media substrate on a platen cart;
   capturing a location of said media substrate on said platen cart with an image capturing apparatus to determine positioning of said over-sized media substrate relative to said platen cart;
   transporting said oversized media substrate on said platen cart, on a rail support track through a digital printing zone configured to impart an image to said over-sized media substrate;
   relaying said position to said digital printing zone with an image processing system so that said printing zone makes positional adjustments to ensure accurate image production on said over-sized media substrate, said digital printing zone imparting said image to said over-sized media substrate while said platen cart moves through said digital printing zone; and
   wherein said image processing system comprises a digital signal relaying system comprises at least one transmitter and at least one receiver, wherein said image capturing apparatus transmits said location of said media substrate on said platen cart to said receiver, and said receiver controllingly engages said printing zone.

12. The method of claim 11 wherein said image processing system further comprises an image on paper correction system.

13. The method of claim 12 wherein said image on paper corrections system comprises Contone High Addressable Image Path Electronic Registration (CHIPER), or the Image Registration Error Control Technology (IRECT).

14. The method of claim 11 wherein said image capturing apparatus is a digital camera.

* * * * *